US007409293B2

(12) United States Patent
Hager et al.

(10) Patent No.: US 7,409,293 B2
(45) Date of Patent: Aug. 5, 2008

(54) METHODS AND SYSTEMS FOR ENHANCING ACCURACY OF TERRAIN AIDED NAVIGATION SYSTEMS

(75) Inventors: James R. Hager, Golden Valley, MN (US); Larry D. Almsted, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 785 days.

(21) Appl. No.: 10/860,418

(22) Filed: Jun. 3, 2004

(65) Prior Publication Data

US 2005/0273257 A1     Dec. 8, 2005

(51) Int. Cl.
*G01C 21/00* (2006.01)
(52) U.S. Cl. ..................... 701/223; 342/121
(58) Field of Classification Search ......... 701/200–223; 342/120–126
See application file for complete search history.

(56) References Cited

U.S. PATENT DOCUMENTS

| | | | |
|---|---|---|---|
| 4,584,646 A | 4/1986 | Chan et al. |
| 4,698,635 A | 10/1987 | Hilton et al. |
| 4,829,304 A | 5/1989 | Baird |
| 4,914,734 A | 4/1990 | Love et al. |
| 5,086,396 A | 2/1992 | Waruszewski, Jr. |
| 5,272,639 A | 12/1993 | McGuffin |
| 5,331,562 A | 7/1994 | McGuffin |
| 5,335,181 A | 8/1994 | McGuffin |
| 5,477,226 A | 12/1995 | Hager et al. |
| 5,912,643 A | 6/1999 | Chew et al. |
| 6,025,800 A | 2/2000 | Hager |
| 6,218,980 B1 | 4/2001 | Goebel et al. |
| 6,362,776 B1 | 3/2002 | Hager et al. |
| 6,407,697 B1 | 6/2002 | Hager et al. |
| 6,415,223 B1 | 7/2002 | Lin et al. |
| 6,512,976 B1 | 1/2003 | Sabatino et al. |
| 6,522,266 B1 | 2/2003 | Soehren et al. |
| 6,744,397 B1 | 6/2004 | Hager et al. |
| 7,095,364 B1 * | 8/2006 | Rawdon et al. ............. 342/120 |

FOREIGN PATENT DOCUMENTS

EP          0381178 A1       8/1990

OTHER PUBLICATIONS

Notification of Transmittal of the International Search Report and the Written Opinion of the International Searching Authority, or the Declaration with International Search Report, Jan. 3, 2007, 6 pgs.

(Continued)

*Primary Examiner*—Richard M. Camby
(74) *Attorney, Agent, or Firm*—Fogg & Powers, LLC

(57) ABSTRACT

A navigation system is described which includes a navigation processor, an inertial navigation unit configured to provide a position solution to the navigation processor, and a digital elevation map. The described navigation system also includes a radar altimeter having a terrain correlation processor configured to receive map data from the digital elevation map and provide a position solution based on radar return data to the navigation processor. A map quality processor within the navigation system is configured to receive map data from the digital elevation map and provide a map quality factor to the navigation processor which weights the position solution from the terrain correlation processor according to the map quality factor and determines a position solution from the weighted terrain correlation processor position solution and the position solution from the inertial navigation unit.

19 Claims, 6 Drawing Sheets

OTHER PUBLICATIONS

International Search Report dated Jul. 9, 2005, Application No. PCT/US2005/006844, 19 pages.

Karnick D.A. "Low Cost Inertial Measuring Unit" ISEE, Mar. 23, 1999, pp. 422-425.

* cited by examiner

METHODS AND SYSTEMS FOR ENHANCING ACCURACY OF TERRAIN AIDED NAVIGATION SYSTEMS

BACKGROUND OF THE INVENTION

This invention relates generally to navigation of air vehicles, and more specifically, to methods and systems for enhancing accuracy of terrain aided navigation systems.

Precision terrain aided navigation (PTAN) correlates interferometric Doppler radar ground return data with a digital elevation map (DEM), resulting in position updates that are provided to a navigation system. Typical navigation systems incorporate at least two sources of navigation data to provide a total position solution. For example, position data from an inertial navigation system (INS), can be combined with position data from PTAN to provide a total position solution. The radar updates from PTAN are utilized to subtract out drift errors that occur within inertial sensor systems like the INS.

Accuracy of the PTAN system relies somewhat on the type of terrain features over which the aircraft is flying. For example, PTAN provides a very low accuracy update over featureless terrain such as water, or flat desert since it is difficult to correlate the featureless terrain with the data stored in the DEM. Conversely, high levels of accuracy are provided over mountainous terrain by a PTAN system because of the ability to correlate the rapidly changing terrain features with the DEM data. Urban areas are similar to mountainous terrain with respect to accuracy of the PTAN system, specifically, the existence of terrain elevation changes as the aircraft moves along its flight path allows for easy correlation with data stored in the DEM.

BRIEF SUMMARY OF THE INVENTION

In one aspect, a terrain aided navigation system is provided which comprises a navigation processor, an inertial navigation unit, a digital elevation map, a radar altimeter, and a map quality processor. The inertial navigation unit is configured to provide a position solution to the navigation processor, and the radar altimeter comprises a terrain correlation processor configured to receive map data from the digital elevation map and provide a position solution based on radar data to the navigation processor. The map quality processor is configured to receive map data from the digital elevation map and provide a map quality factor to the navigation processor. The navigation processor is configured to weight the position solution from the terrain correlation processor according to the map quality factor and determine a position solution from the weighted terrain correlation processor position solution and the position solution from the inertial navigation unit.

In another aspect, a method for navigating a vehicle is provided which comprises receiving a position solution from an inertial navigation unit, and receiving a terrain correlated position solution from a terrain aided navigation system which correlates radar altimeter data with digital elevation map data. The method further comprises weighting the terrain correlated position solution based on a map quality factor, the map quality factor based at least partially on digital elevation map data, and combining the position solution from the inertial navigation unit with the weighted terrain correlated position solution into a navigation position solution.

In still another aspect, a processor programmed to determine a quality of data stored within a digital elevation map is provided. The processor is configured to receive heading and altitude from an inertial navigation system, receive map data from a digital elevation map, and calculate a map quality factor that is based at least partially on the map data.

In yet another aspect, a navigation processor programmed to determine a navigation position solution is provided. The navigation processor is configured to receive a position from an inertial navigation system, receive a position from a terrain correlated radar altimeter, and receive a map quality factor from a map quality processor. The navigation processor is programmed to weight the position received from the terrain correlated radar altimeter based on the map quality factor.

DETAILED DESCRIPTION OF THE INVENTION

Figure 1:
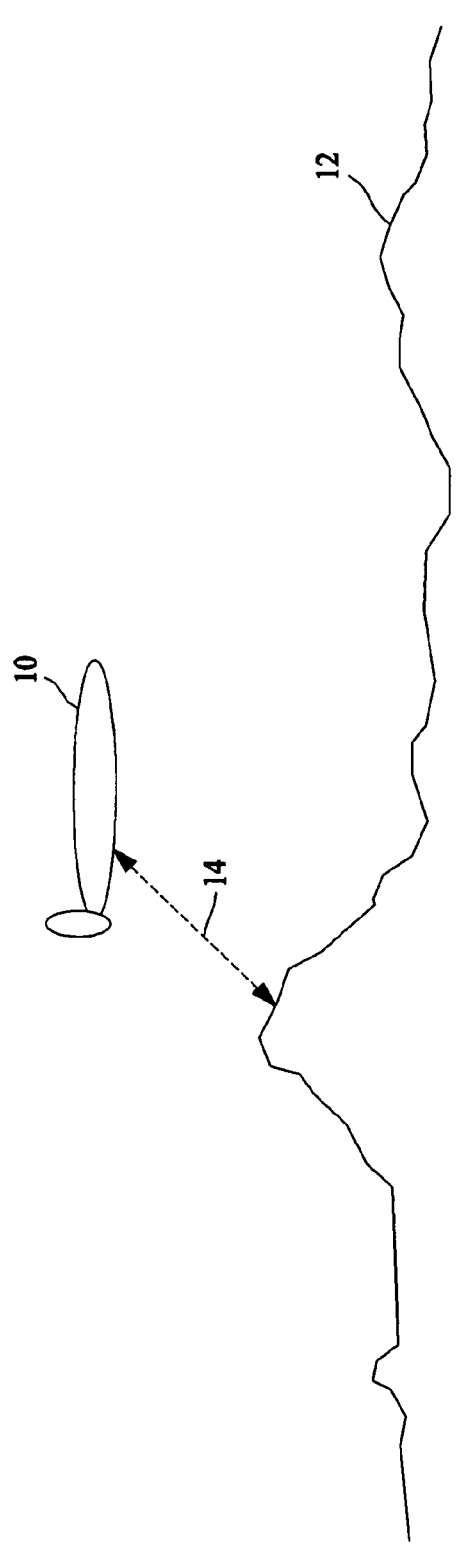
FIG. 1 illustrates an aircraft flying over a terrain with abundant features.

FIG. 1 illustrates an aircraft 10 flying over a terrain 12 with abundant features. A radar altimeter (not shown) within aircraft 10 transmits a beam 14 towards terrain 12 and receives the reflected beam 14 for processing. The widely varying features of terrain 12 allow for easy correlation of the altitudes provided by the radar altimeter with a digital elevation map (not shown). Correlation of the altitudes provided by the radar altimeter with the digital elevation map provide a mechanism for determining a location of aircraft 10 with respect to the digital elevation map.

Figure 2:
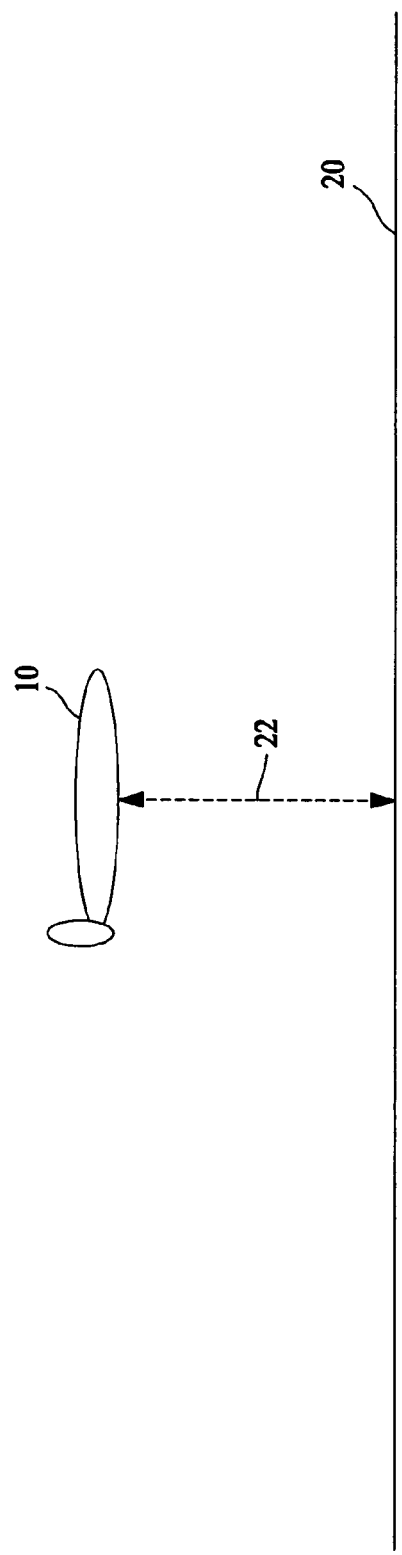
FIG. 2 illustrates the aircraft flying over a featureless terrain.

FIG. 2 illustrates aircraft 10 flying over a featureless terrain 20. Examples of featureless terrains similar to terrain 20 include bodies of water or a flat plain or desert. Again, the radar altimeter (not shown) within aircraft 10 transmits a beam 22 towards terrain 20 and receives the reflected beam 22 for processing. The non-varying features of terrain 20 make it difficult to correlate the altitudes provided by the radar altimeter with the digital elevation map since the radar altimeter will continually provide the same altitude data. As an example, a lake surface could be several thousand acres in area, all having the same altitude. In addition, depending on resolution, the digital elevation map may include multiple map entries representative of lake altitude data stored therein. In such a scenario, radar altimeter determined altitudes cannot be correlated with a particular map entry for the lake since all altitudes are the same.

Figure 3:
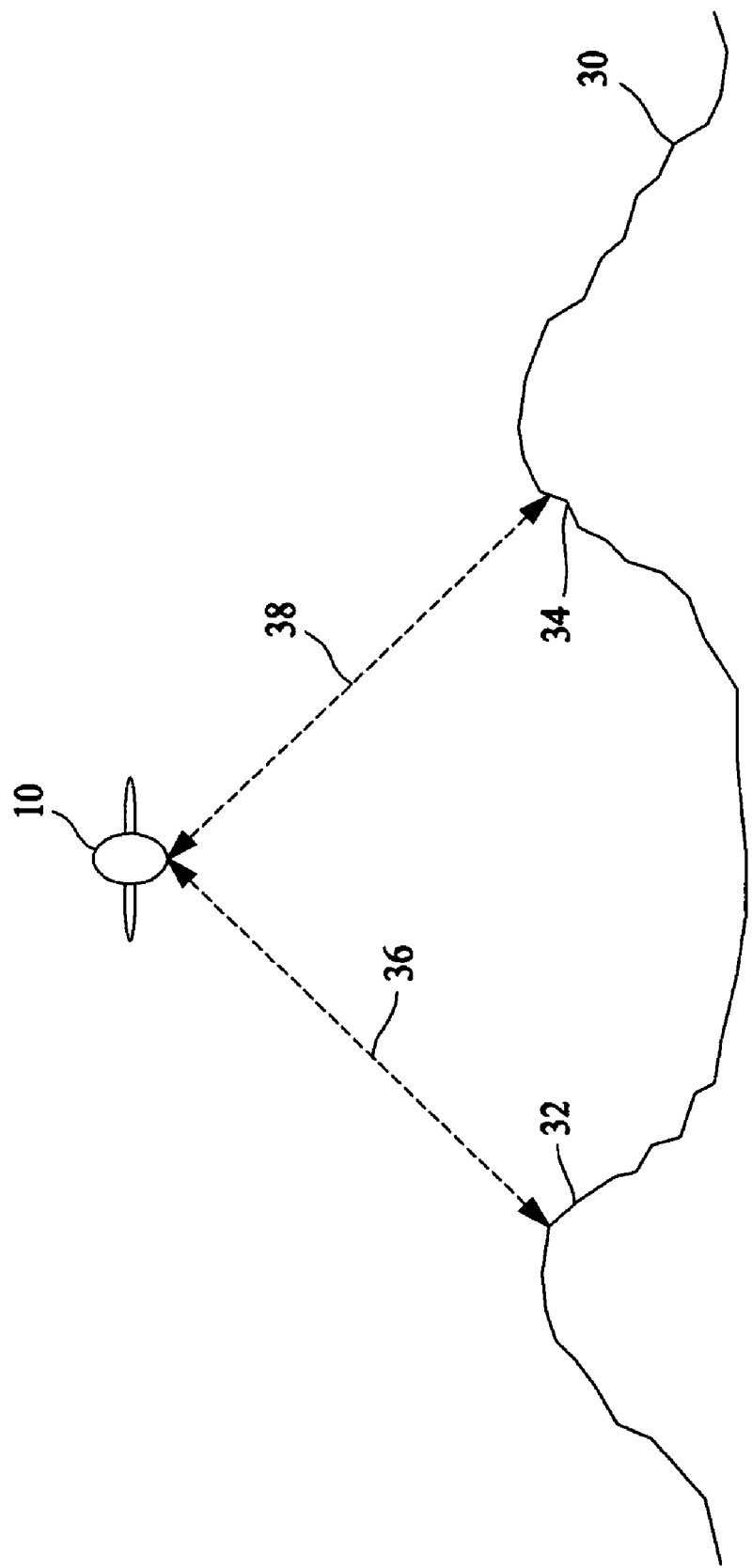
FIG. 3 illustrates the aircraft flying over an area of abundant terrain features which results in a poor position update due to the two equal ridges providing a position solution halfway between the two ridges.

FIG. 3 illustrates aircraft 10 flying over having area of abundant terrain features 30, while still resulting in a poor correlation with the digital elevation map. The poor correlation, even though terrain 30 has abundant features 30, is due to two equal altitude ridges 32 and 34, which results in a position solution halfway between two ridges 32 and 34, based on the digital elevation map. To further explain the poor correlation between the radar altimeter and the digital elevation map, even with abundant terrain features 30, a short explanation of operation of the radar altimeter follows. A radar altimeter provides cross-track and vertical distance to the highest object below aircraft 10 in down-track swaths, which are bounded in the cross-track direction by an antenna pattern. Beams 36 and 38 illustrate one embodiment of the bound of the cross-track pattern. As used herein, "Down-track" means in the direction of travel and "Cross-track" means perpendicular to the direction of travel. The downtrack width of a swath varies with the altitude of aircraft 10.

A digital elevation map is comprised of resolution cells, each of which has an associated elevation representing the highest terrain elevation in that cell. Position updates are derived by correlation of the radar altimeter derived elevation associated with the cell of generally, highest elevation with the map elevation data. Accurate correlation requires elevation changes, and changes in cross track position of the cell of highest elevation within a certain swath down track resolution size as the aircraft advances down its flight path. Referring again to FIG. 3, equal altitude ridges 32 and 34, while providing elevation changes in the cross-track pattern, do not provide changes in cross track position of the cell having the highest elevation.

Figure 4:
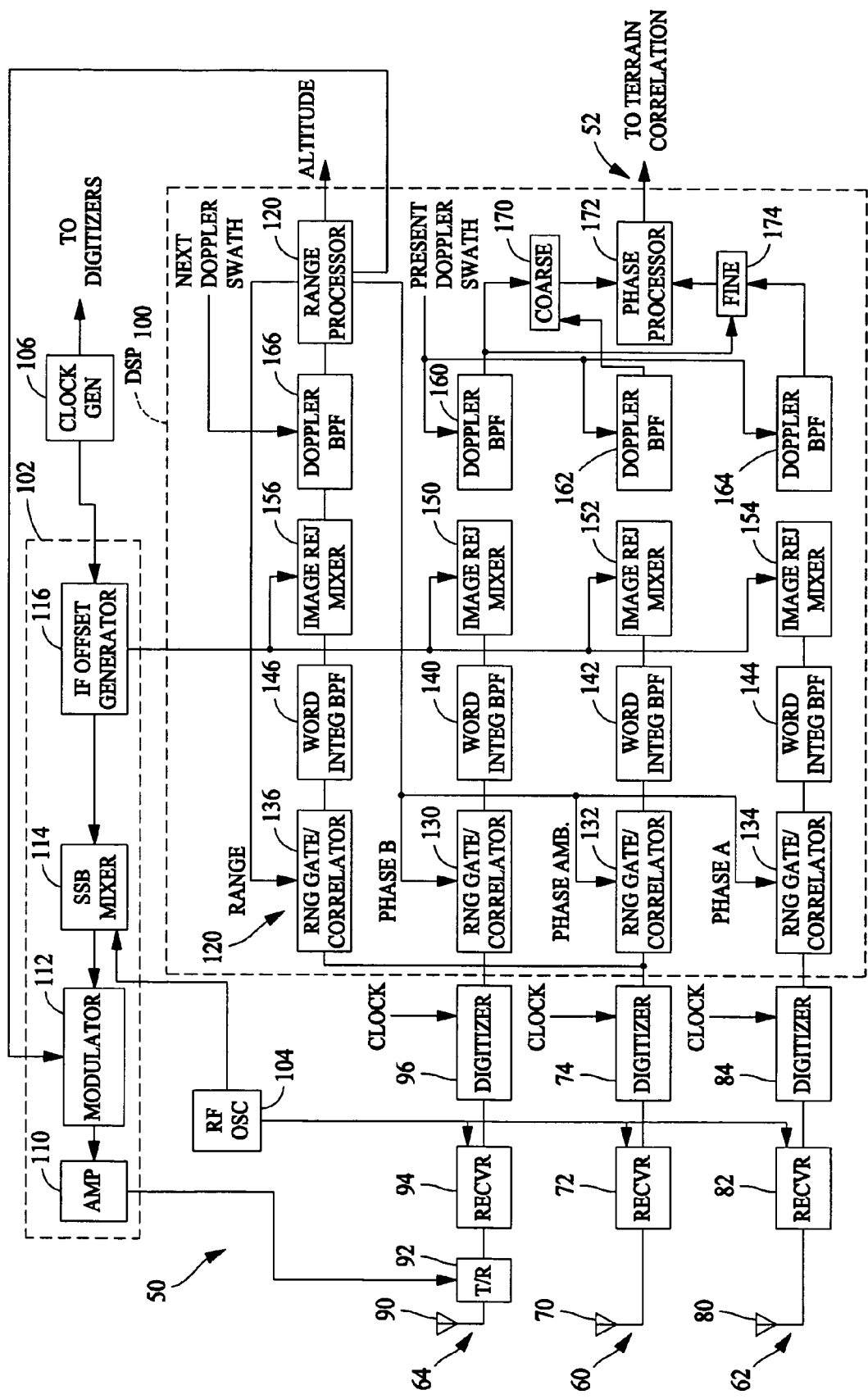
FIG. 4 is a block diagram of a radar altimeter having a position output to a terrain correlation processor.
Figure 5:
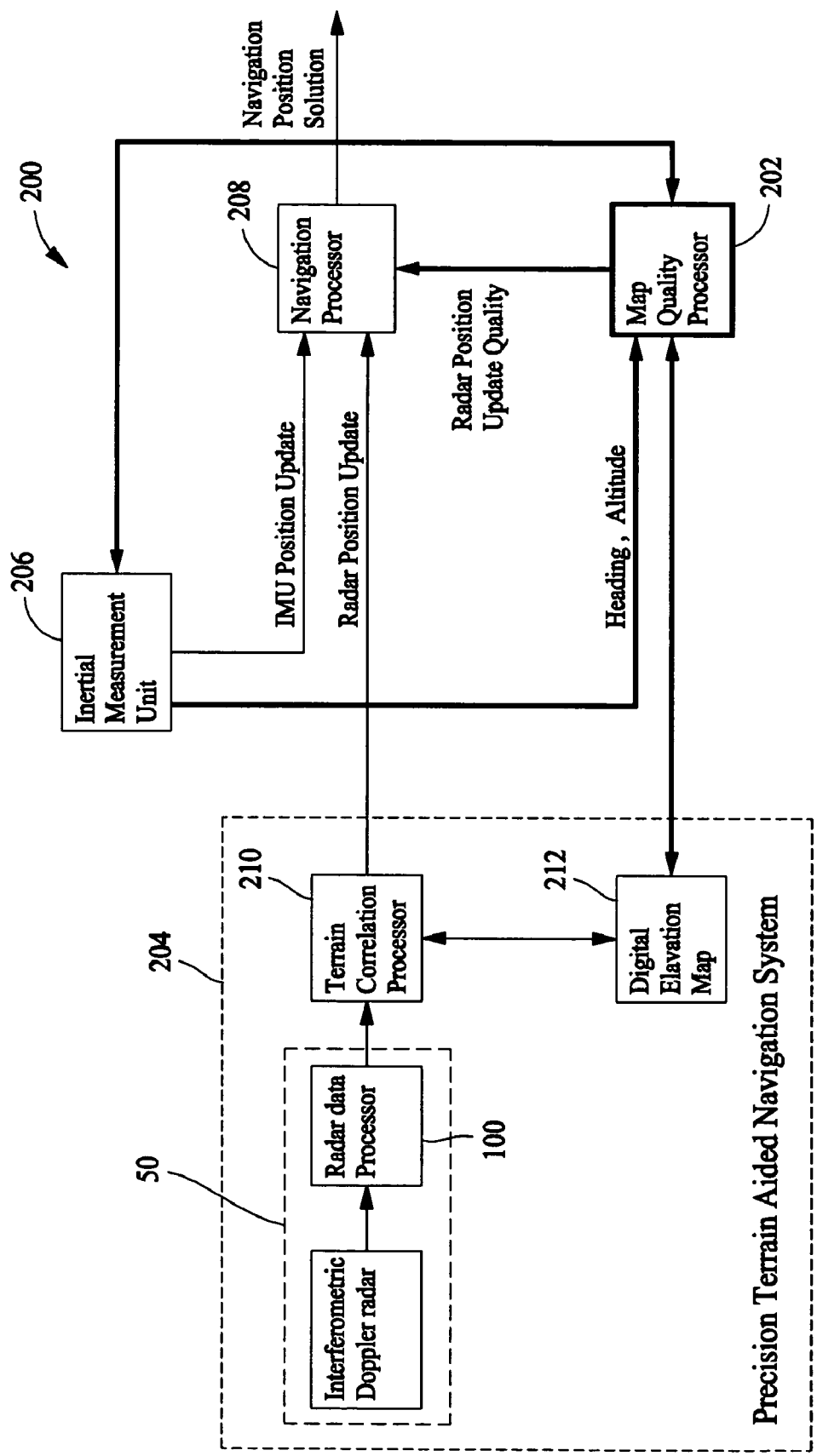
FIG. 5 is a block diagram of a navigation system incorporating a map quality processor.

FIG. 4 is a block diagram of a radar altimeter 50 having a position output 52 to a terrain correlation processor (shown in FIG. 5). In one embodiment, radar altimeter 50 is incorporated in an air vehicle, for example, aircraft 10 (shown in FIGS. 1-3). Radar altimeter 50 includes three channels: phase ambiguity channel 60, phase A channel 62 and phase B channel 64. Phase ambiguity channel 60 includes antenna 70, receiver 72 and digitizer 74. Phase A channel 62 includes antenna 80, receiver 82 and digitizer 84. Phase B channel 64 includes antenna 90, transmit/receive switch 92, receiver 94 and digitizer 96. In one embodiment, receivers 72, 82 and 84 each include a low noise amplifier, mixer and intermediate frequency (IF) amplifier (none shown). Transmit/receive switch 92 in channel 64 allows channel 64 to operate in either a transmit mode or a receive mode.

Radar altimeter 50 further includes digital signal processor (DSP) 100, transmitter 102, RF oscillator 104, and clock generator 106. Transmitter 102 includes power amplifier 110, modulator 112, single side band (SSB) mixer 114 and intermediate frequency (IF) offset generator 116. RF oscillator 104 is coupled to mixers within receivers 72, 82, and 94 and SSB mixer 114. Clock generator 106 is coupled to digitizers 74, 84, and 96 and IF offset generator 116.

Radar altimeter 50 transmits a radar signal toward the ground which is generated as set forth herein. Specifically, clock generator 106 operates at a frequency and provides a clock signal to IF offset generator 116. IF offset generator 116 generates an offset signal for the transmitted radar signal. As an example, for a clock generator 106 frequency of 120 MHz, IF offset generator 116 divides the clock signal from clock generator 106 by four, and outputs a clock signal at 30 MHz. SSB mixer 114 mixes the 30 MHz clock signal from IF offset generator 116 with an RF signal from RF oscillator 104, resulting in a 30 MHz offset of the RF signal. SSB mixer 114 outputs the offset signal to modulator 112. An example RF oscillator 104 operates at about 4.3 GHz, and modulator 112 receives transmit code data from range processor 120, and pulse modulates and phase modulates the signal received from SSB mixer 114 and outputs the modulated signal to power amplifier 110. Power amplifier 110 amplifies the received signal and outputs the amplified signal to antenna 90 through transmit/receive switch 92. Antenna 90 transmits the modulated signal toward the ground.

After a radar signal is transmitted by channel 64, the signal reflected from the ground is received by antennas 70, 80, and 90 and is processed by the components within each of channels 60, 62, and 64. Further, each of channels 60, 62, and 64 performs the same functions as the other channels. Therefore, only the functions performed by channel 64 will be described.

The return signal received by antenna 90 passes through transmit/receive switch 92 to receiver 94. Within receiver 94 the return signal is amplified, mixed, down to an IF offset signal, amplified again, and output to digitizer 96. Digitizer 96 digitizes the received signal and outputs the digitized signal to DSP 100 for further processing. The frequency of clock generator 106 determines the rate that the incoming analog signals on channels 60, 62, and 64 are sampled and digitized by digitizers 74, 84, and 96 respectively.

For each channel 60, 62, and 64, plus a range channel 120 including a range processor 122, DSP 100 includes range gate/correlators 130, 132, 134, and 136, word integration band pass filters (BPFs) 140, 142, 144, and 146, image reject mixers 150, 152, 154, and 156, and doppler band pass filters (BPFs) 160, 162, 164, and 166. Range processor 120 receives the output from doppler BPF 166 to determine an altitude. Coarse phase processor 170, coordinate location processor 172 and fine phase processor 174, are sometimes collectively referred to as a phase processor.

When a radar signal is transmitted down to the ground, the return signal comes back at the same frequency as the transmitted signal plus (or minus) a doppler shift. If the radar altimeter is transmitting signals towards the ground forward of air vehicle 10, the return signals will be doppler shifted up in frequency. If the radar is transmitting signals towards the ground behind air vehicle 10, the return signal will be doppler shifted down in frequency.

By properly adjusting doppler band pass filters 160, 162, 164, and 166, any point on the ground can be selected and bounded. Therefore, only return signals from the one selected ground swath are processed. The horizontal location of the highest point within a particular swath is determined by performing phase comparisons of the return signals. If the highest point being illuminated by radar is directly below air vehicle 10, then the return signal will come back at the same time to antennas 80 and 90. Alternatively, if the highest point is off to one side of air vehicle 10, the return signal will be received by one antenna (e.g., antenna 90) before it is received by the second antenna (e.g., antenna 80), because the path is longer from and to second antenna 80. The phase or the time of arrival of the return signals at each of the antennas is compared. The greater the distance between the two antennas 80 and 90, the more accurate the measurements will be. However, as the distance between antennas 80 and 90 increases, one or more phase ambiguities may result. At a typical antenna separation, three or four phase ambiguities may occur. Such antenna separation is sometimes referred to as multiple wavelength antenna separation.

The phase ambiguity problem associated with multiple wavelength antenna separation is solved through the addition of a third antenna 70 spaced from antennas 80 and 90 such that the combination of the three phase comparisons eliminates the ambiguity. The third antenna 70 is referred to as an ambiguity antenna. The ambiguity antenna 70 is positioned closer to one of the other two antennas 80 or 90, such that there are no phase ambiguities between the ambiguity antenna 70 and the antenna closest to the ambiguity antenna. Because of the small baseline or distance separation between the ambiguity antenna 70 and the antenna closest to the ambiguity antenna, accuracy is lost. Therefore, the widely spaced antennas 80 and 90 are used to provide the necessary accuracy, and the two closely spaced antennas are used to eliminate the phase ambiguities.

Radar altimeter 50 outputs target position vectors identifying the position of the highest point within particular regions or "swaths" on the ground, and also outputs above ground level (AGL) altitude data that identifies the vehicle altitude. The target position vectors are output to a terrain correlation processor and utilized for terrain correlation as further described below.

FIG. 5 is a block diagram of a PTAN/IMU navigation system 200 incorporating a map quality processor 202, a PTAN system 204, an inertial measurement unit (IMU) 206 (sometimes referred to as an inertial navigation unit or inertial navigation system), and a navigation processor 208. PTAN system 204 includes radar altimeter 50 as described above, a terrain correlation processor 210 and a digital elevation map (DEM) 212. DEM 212 includes data relating to the elevation of different portions of a geographic area. As described above, radar altimeter 50 outputs target position vectors to terrain correlation processor 210 which correlates the target position vectors with data from DEM 212, relating to a specific geographic area, to determine a radar position, which is provided to navigation processor 208. IMU 206 provides a position to navigation processor 208 based on measurements made by the inertial sensors within IMU 206. IMU 206 also provides a heading and altitude to map quality processor 202.

Navigation processor 208 utilizes a present navigation position solution and estimates a path ahead of aircraft 10 by extending previous navigation position solutions. Map quality processor 202 includes a random distribution measurement algorithm which provides a map quality factor (e.g. radar position update quality) that is utilized by navigation processor 208 to weight the affect of radar position updates from terrain correlation processor 210. The radar position and map quality factor are utilized in combination to address a drift in the IMU position update from IMU 206 which naturally occurs sometimes within IMU 206. In one embodiment, the random distribution measurement algorithm utilizes heading and altitude from IMU 206 in determining the map quality factor as shown.

In one embodiment, the map quality factor is calculated by map quality processor 202 through an analysis of approaching terrain features stored in digital elevation map 212. In the embodiment, the random distribution measurement algorithm is applied both in cross track position and elevation to digital elevation map 212 data along a projected flight path to calculate the map quality factor.

As further described below, digital elevation map 212 includes a plurality of map cells, and weighting the terrain correlated position solution includes determining a locus of map cells having the highest elevation which swings back and forth a cross track swath and providing an elevation mapping which varies in elevation for the cross track swath. A width of the cross track swath is determined utilizing a field of view of the radar altimeter and a current altitude.

Figure 6:
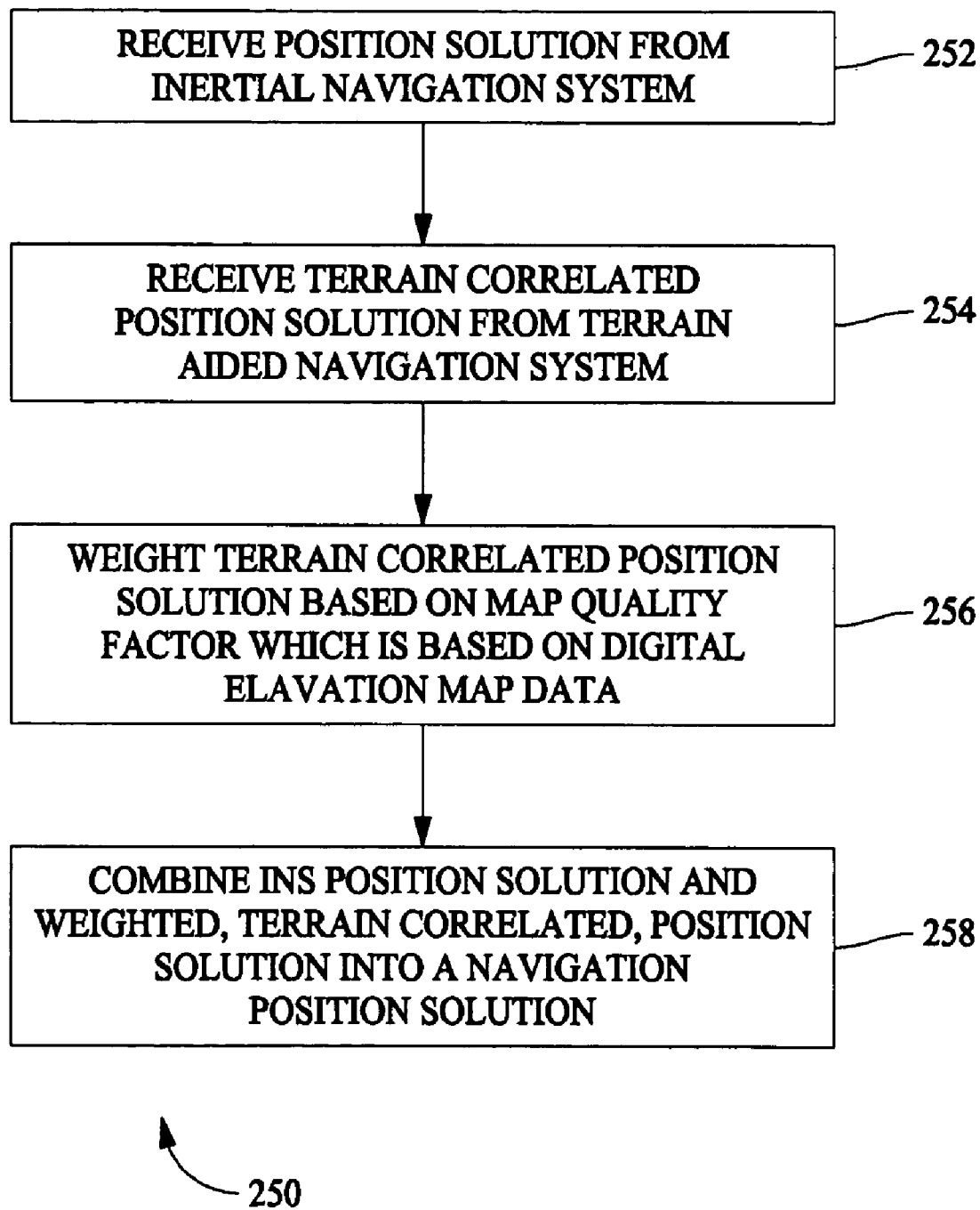
FIG. 6 is a flowchart of a method for navigating a vehicle.

FIG. 6 is a flowchart 250 which illustrates a method for navigating a vehicle incorporating PTAN/IMU navigation system 200. The method includes receiving 252 a position solution from an inertial navigation system, for example, IMU 206. A terrain correlated position solution is received 254 from a terrain aided navigation system which correlates radar altimeter data with digital elevation map 212 data. The terrain correlated position solution is weighted 256 based on a map quality factor which is at least partially based on digital elevation map 212 data. The position solution from the inertial navigation system is combined 258 with the weighted terrain correlated position solution into a navigation position solution.

Figure 7:
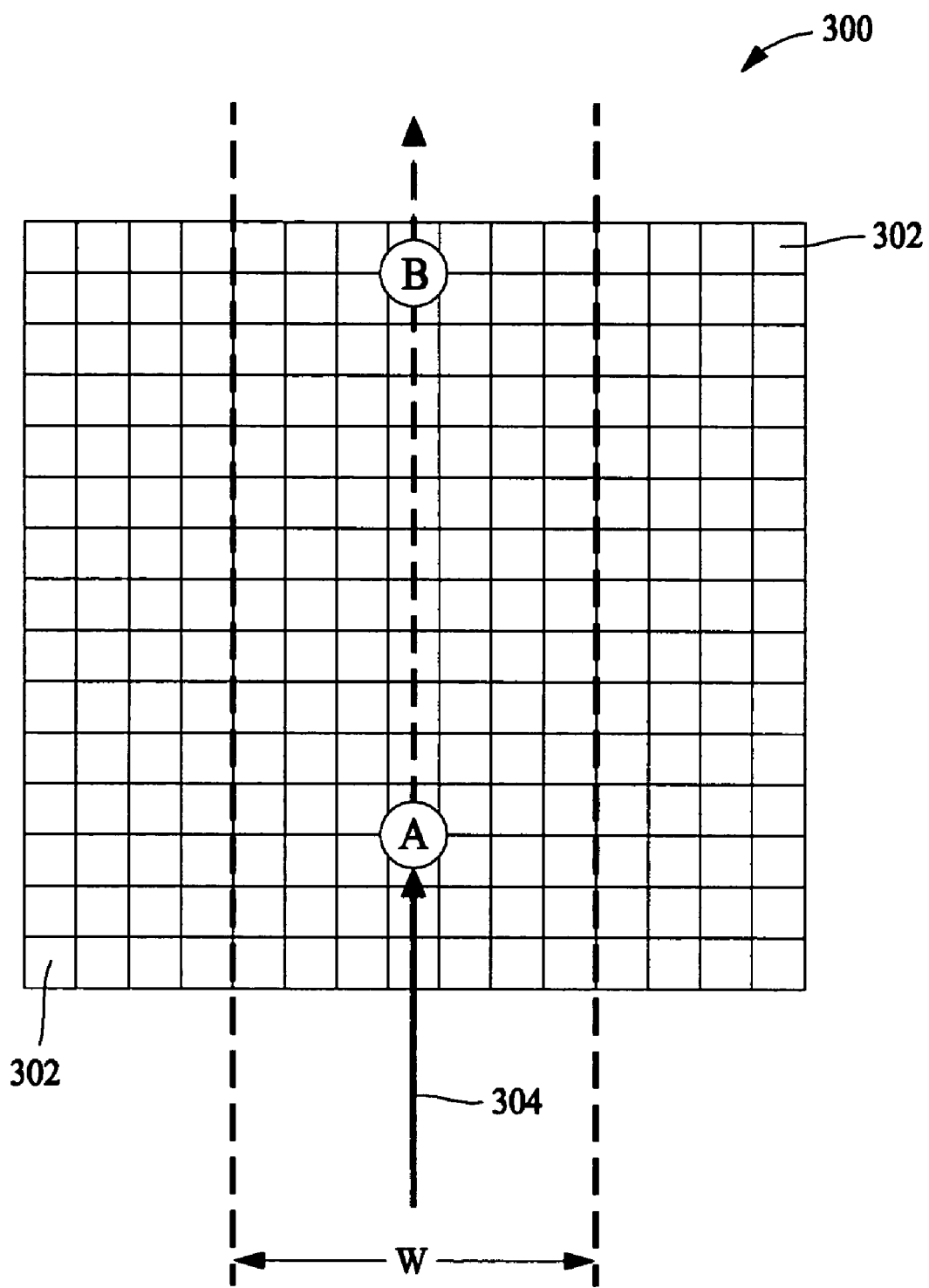
FIG. 7 is a diagram of map cells utilized in map quality processing.

FIG. 7 is a grid 300 representing map cells 302 within DEM 212 which are utilized in map quality processing. A flight path 304, including present position "A" and extending along an expected path through position "B" overlays the map cells 302. Radar altimeter 50 shown in FIG. 4 includes, for example, a cross-track swath of terrain of width "W". Each map cell 302 on the map (e.g., grid 300) has an associated elevation representing the highest terrain elevation in that cell. Radar position updates are derived by correlation of the radar derived elevation (altitude) from processor 100 (shown in FIG. 5) with an individual map cell 302 having generally, the highest elevation data. As described above, accurate correlation requires elevation changes, and changes in cross track position of map cell 302 of highest elevation within a particular swath down track resolution size as aircraft 10 advances down flight path 304. Thus, a locus of map cells of highest elevation which swings back and forth in cross track, and at the same time providing a elevation mapping varying in elevation, both in a random fashion, will provide a very high quality radar position update. Thus, application of a random distribution measurement algorithm both in cross track position, and elevation along flight path 304, results in a high quality measure of the map quality on flight path 304 ahead of aircraft 10.

While the invention has been described in terms of various specific embodiments, those skilled in the art will recognize that the invention can be practiced with modification within the spirit and scope of the claims.

What is claimed is:

1. A terrain aided navigation system comprising:
   a navigation processor;
   an inertial navigation unit configured to provide a position solution to said navigation processor;
   a digital elevation map;
   a radar altimeter comprising a terrain correlation processor configured to receive map data from said digital elevation map and provide a position solution based on radar return data to said navigation processor; and
   a map quality processor configured to receive map data from said digital elevation map and provide a map quality factor to said navigation processor, said navigation processor configured to weight the position solution from said terrain correlation processor according to the map quality factor, said navigation processor configured to determine a position solution from the weighted terrain correlation processor position solution and the position solution from said inertial navigation unit.

2. A navigation system according to claim 1 wherein said map quality processor is configured to calculate the map quality factor by analyzing approaching terrain features on said digital elevation map.

3. A navigation system according to claim 2 wherein to calculate the map quality factor said map quality processor is configured to apply a random distribution measurement algorithm both in cross track position and elevation to said digital elevation map data along a projected flight path.

4. A navigation system according to claim 1 wherein said digital elevation map comprises a plurality of map cells, said terrain correlation processor configured to randomly:
   determine a locus of said map cells of highest elevation back and forth across a cross track swath; and
   provide an elevation mapping varying in elevation for the cross track swath.

5. A navigation system according to claim 4 wherein a width of the cross track swath is determined by a fixed field of view of said radar altimeter and a current altitude.

6. A navigation system according to claim 1 wherein said map quality processor is configured to utilize a present position solution and an extension of previous position solutions to estimate a flight path.

7. A navigation system according to claim 1 wherein said map quality processor is configured to receive a heading and an altitude from said inertial navigation system.

8. A navigation system according to claim 7 wherein said navigation processor is configured to utilize the weighted position solution from said radar altimeter to reduce a position drift in the position solution received from said inertial navigation system.

9. A method for navigating a vehicle comprising:
receiving a position solution from an inertial navigation unit;
receiving a terrain correlated position solution from a terrain aided navigation system which correlates radar altimeter data with digital elevation map data;
weighting the terrain correlated position solution based on a map quality factor, the map quality factor based at least partially on digital elevation map data; and
combining the position solution from the inertial navigation unit with the weighted terrain correlated position solution into a navigation position solution.

10. A method according to claim 9 further comprising calculating the map quality factor by analyzing approaching terrain features on the digital elevation map.

11. A method according to claim 10 wherein calculating the map quality factor comprises applying a random distribution measurement algorithm both in cross track position and elevation to digital elevation map data along a projected flight path.

12. A method according to claim 9 wherein the digital elevation map comprises a plurality of map cells, and said weighting the terrain correlated position solution comprises:
determining a locus of said map cells of highest elevation which swings back and forth a cross track swath; and
providing an elevation mapping varying up and down in elevation for the cross track swath.

13. A method according to claim 12 further comprising determining a width of the cross track swath utilizing a field of view of the radar altimeter and a current altitude.

14. A method according to claim 9 further comprising utilizing a present navigation position solution and extending previous navigation position solutions to estimate a flight path.

15. A processor programmed to determine a quality of data stored within a digital elevation map, said processor configured to:
receive heading and altitude from an inertial navigation unit;
receive map data from a digital elevation map; and
calculate a map quality factor by applying a random distribution measurement algorithm in cross track position and elevation to the digital elevation map data along a projected flight path.

16. A processor according to claim 15 programmed to calculate the map quality factor by analyzing approaching terrain features on the digital elevation map.

17. A processor according to claim 15 programmed to utilize a present position solution and an extension of previous position solutions to estimate a flight path.

18. A navigation processor programmed to determine a navigation position solution, said navigation processor configured to:
receive a position from an inertial navigation unit;
receive a position from a terrain correlated radar altimeter;
receive a map quality factor from a map quality processor, said navigation processor programmed to weight the position received from the terrain correlated radar altimeter based on the map quality factor; and
utilize a present position solution and an extension of past position solutions to estimate a flight path.

19. A navigation processor according to claim 18 programmed to configured to utilize the weighted position solution received from the terrain correlated radar altimeter to reduce position drift in the position solution received from the inertial navigation system.

* * * * *